Feb. 16, 1960  P. R. BLACK  2,925,159
FLUID PRESSURE OPERATED CLUTCH MEANS
Filed April 28, 1958  2 Sheets-Sheet 1
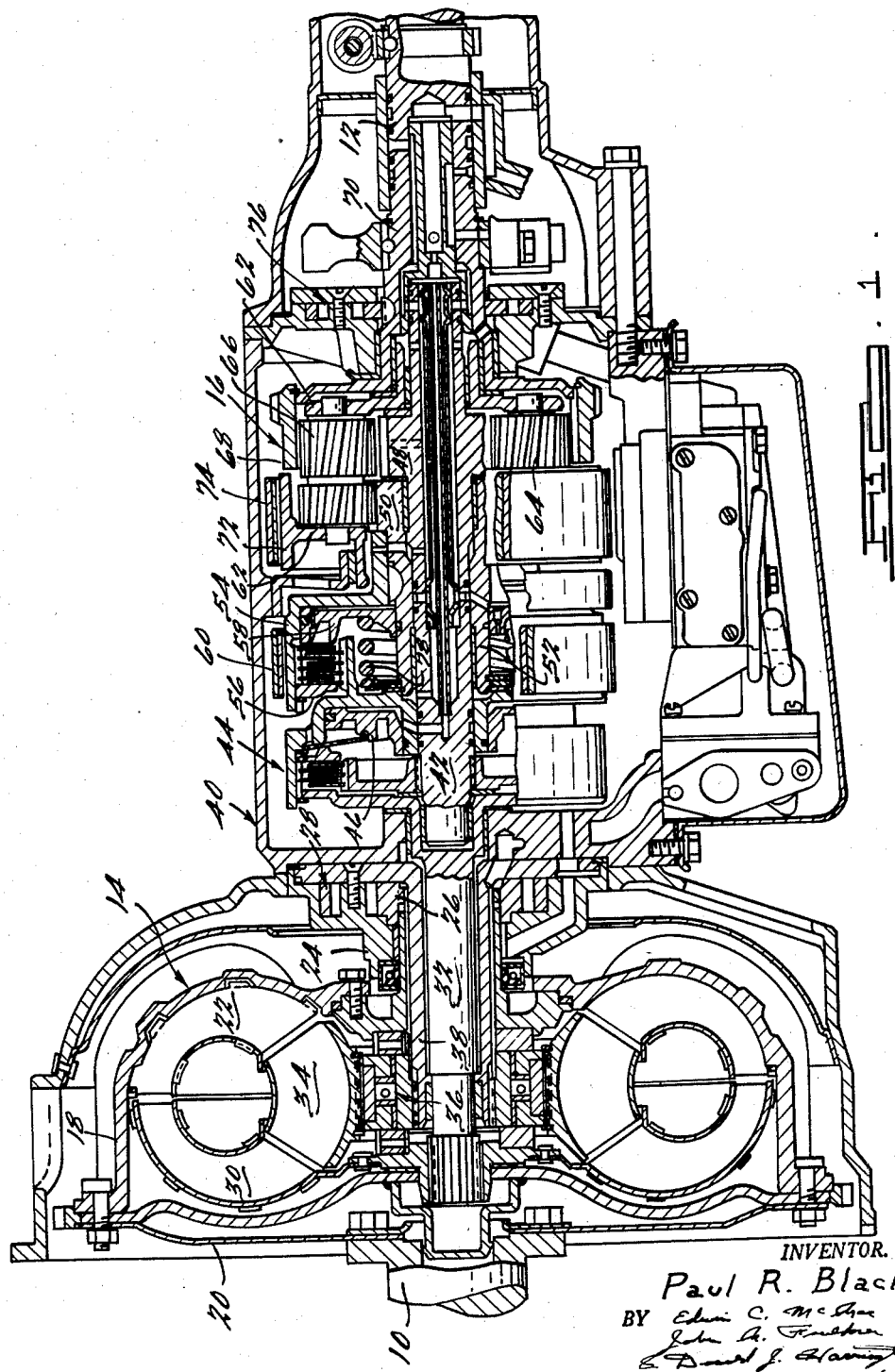
INVENTOR.
Paul R. Black
BY
ATTORNEYS.

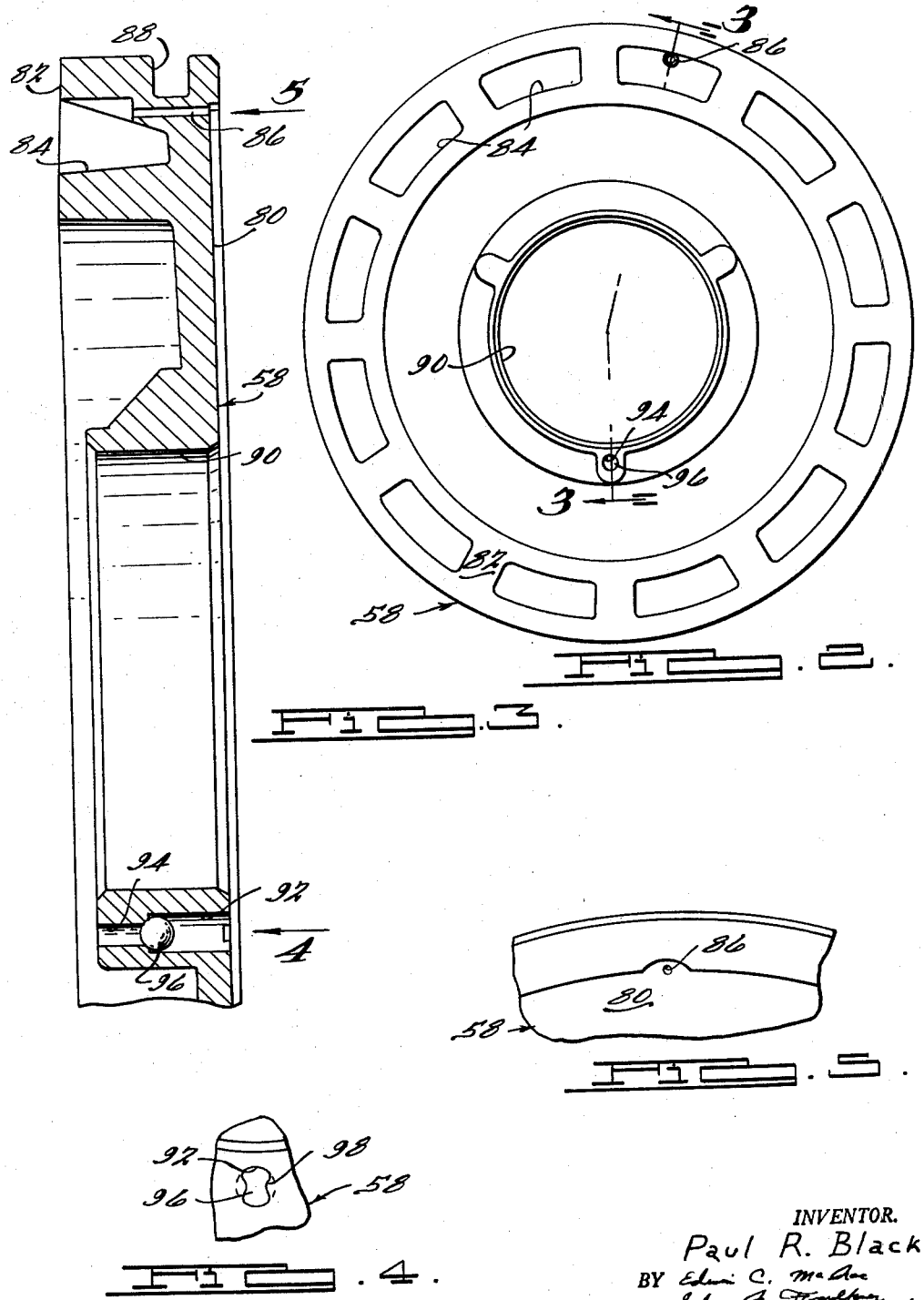

United States Patent Office 2,925,159
Patented Feb. 16, 1960

2,925,159

FLUID PRESSURE OPERATED CLUTCH MEANS

Paul R. Black, Garden City, Mich., assignor to Ford Motor Company, Dearborn, Mich., a corporation of Delaware Application April 28, 1958, Serial No. 731,499

6 Claims. (Cl. 192—85)

My invention relates generally to fluid pressure operated clutches and more particularly to a new and improved means for venting residual working fluid from the fluid pressure servo for a friction clutch after the servo is de-energized thereby preventing an undesirable centrifugal pressure build up in the clutch servo as the clutch structure is rotated.

I contemplate that the improvement of my instant invention may be readily applied to pressure operated fluid clutches for automatic power transmission mechanisms wherein the clutch structure defining the working chamber of the clutch servo rotates conjointly with one or more of the transmission gear elements during operation in a specified torque multiplication ratio. I am aware of several automatic power transmission mechanisms currently in use in the automotive vehicle industry which embody epicyclic or planetary gear units adapted to form torque delivery paths between the vehicle engine and the vehicle traction wheels with varying torque multiplication ratios. The relative motion between the elements of the planetary gear units may be controlled by means of clutches and brakes to appropriately condition the gear units for any desired ratio. For example, a first fluid clutch and a second clutch or brake may be simultaneously energized to obtain one torque multiplication ratio and this first clutch may be de-energized while another clutch or brake is energized to condition the transmission for operation in another ratio. In the disclosed embodiment, the servo structure of the first clutch is rotated about the axis of the gear unit during operation in this other ratio and since the first servo is normally filled with residual fluid after the clutch is de-energized, there is a tendency for centrifugal pressure to build up behind the servo piston as the de-energized clutch servo is rotated. At the higher speeds the centrifugal pressure will cause the de-energized clutch servo to become partially engaged thus causing an undesirable drag on the clutch friction elements by reason of the opposed torques thus established. This so-called "drift on" condition results in premature clutch failure and is often the proximate or remote cause of a variety of other service problems.

It is a primary object of my invention to provide a means for eliminating this centrifugal pressure build up in fluid pressure operated servos during operation of the clutch structure with the clutch in a de-energized condition, thereby eliminating the many operational difficulties traceable thereto.

It is another object of my invention to provide an improved fluid pressure operated clutch of the type above described wherein valve means are provided in the clutch for venting the clutch working chamber when the clutch is de-energized, thereby avoiding an undesirable pressure build up.

It is another object of my invention to provide an improved clutch vent valve means as set forth in the preceding object wherein the valve means is simple in construction and reliable in operation.

It is another object of my invention to provide a fluid pressure release valve for a hydraulic pressure chamber as above set forth which is automatic in operation and which requires no adjustment after assembly.

It is a further object of my invention to provide a hydraulic clutch pressure release valve capable of exhausting fluid from the working chamber of the clutch and replacing the fluid with air while avoiding aeration of the fluid transfer passages communicating with the working chamber.

Other objects and advantages will readily become apparent from the following description and from the accompanying drawings:

In carrying forth the foregoing objects, I have applied the improved pressure release means of my instant invention to a clutch servo having an annular cylinder and an annular piston, said cylinder and piston cooperating to define a fluid pressure working chamber. One wall of the working chamber is formed with an axially extending passage proximate to the outermost region of the working chamber and another axial passage is formed at a radially inward position, preferably as close to the axis of rotation of the servo as practicable. A check valve element is positioned in the radially inward passage and is adapted to inhibit the transfer of working pressure from the working chamber when the servo is energized and to accommodate passage of air from the exterior of the servo into the working chamber when the servo is de-energized. The radially outward passage is continuously open but is of a sufficiently small size to allow a working pressure to build up to the required level when clutch energizing pressure is introduced into the working chamber. When the clutch is to be de-energized, the supply of clutch energizing pressure is interrupted and the working chamber is exhausted, thus allowing the residual fluid to be pumped out of the radially outward passage under the centrifugal pumping action established by the rotating cylinder and piston. This pumping action causes the valve element to become unseated to permit the entry of air into the working chamber, and the air replaces the residual fluid as the latter is pumped out of the radially outward passage.

I contemplate that the radially outward passage may be formed in the movable piston of the servo and that it will be blocked or closed by the clutch friction elements when the piston is moved into contact therewith. This prevents the continued discharge of pressurized working fluid through the radially outward passage after the clutch is fully engaged and a continuous flow of working fluid through the servo is therefore not required.

It is important to prevent aeration of the various passages extending to the clutch working chamber since this would necessitate the discharge of an undesirably large volume of fluid out of the control circuit which in turn would tend to have an adverse effect on the control functions of the circuit. More particularly, the timing of the shift sequences would tend to deviate from the optimum by reason of the time required to refill the exhausted portion of the circuit during a given shifting operation. Further, it is possible that the fluid itself would become aerated to form an admixture of air and fluid which would not function as a suitable fluid medium for a control system. The elements of the improved mechanism of my instant invention have been strategically located in the rotatable portions of the clutch structure in order to prevent these undesirable side effects.

For the purpose of more particularly describing a preferred embodiment of my invention, reference may be made to the accompanying drawings wherein Figure 1 is a cross sectional assembly view of a well known multiple speed automatic power transmission mechanism for automotive use with which the improved clutch structure of my invention may be applied.

Figure 2 is a side elevation view of a clutch piston forming a part of the assembly of Figure 1.

Figure 3 is a cross sectional view of the piston of Figure 2 and is taken along section line 3 of Figure 2.

Figure 4 is a partial end view of the piston of Figures 2 and 3 as viewed in the direction of arrow "4" shown in Figure 3.

Figure 5 is a partial end view of the piston shown in Figures 2 and 3 as viewed in the direction of arrow "5" of Figure 3.

Referring first to Figure 1, numeral 10 is used to designate an engine crankshaft and numeral 12 designates the power output crankshaft or driven shaft. A hydraulic torque converter and a cooperating planetary gear arrangement are provided to form a powered connection between shafts 10 and 12 in which provision is made for varying the magnitude of the input torque relative to the output torque within a relatively large speed range. The torque converter is generally designated in Figure 1 by numeral 14 and the planetary gear portion of the transmission is generally designated by numeral 16.

Reference may be made to the patent to Wayman (2,770,148) for a particular description of a transmission of the type herein disclosed and of an automatic control system for controlling the operation of the transmission clutches and brakes. The description of the over-all transmission structure in the instant specification will be of a general character although the rear clutch and the valve means associated therewith will be described with particularity.

The crankshaft 10 is positively connected to the converter pump housing 18 by means of a drive plate 20. The pump housing 18 includes a bladed converter pump member 22 and it is journaled on a stationary support 24 as indicated. The hub of the pump housing 18 is drivably connected to an external gear 26 of a positive displacement fluid pump 28, said pump forming a portion of a control circuit for supplying control pressure to the transmission control elements.

The torque converter 14 further includes a bladed turbine member 30 disposed in juxtaposed relationship with respect to pump member 22 and positively splined to an intermediate power delivery shaft 32.

A torque converter reactor member is shown at 34 and is positioned between the exit of the turbine member 30 and the entrance of a section of pump member 22. Reactor member 34 is mounted on a one way clutch mechanism generally shown at 36 which includes an inner race carried by a stationary stator shaft 38. The support 24 and the stator shaft 38 are joined to the transmission casing which is generally designated by numeral 40.

The shaft 32 may be clutched to a ring gear shaft 42 by means of a front clutch generally designated by numeral 44, said front clutch 44 including a fluid pressure operated servo with an annular piston 46. Shaft 42 is joined to or is integrally formed with a rear sun gear 48. A front sun gear is shown at 50 and it is integrally formed with a sun gear sleeve shaft 52 which may be keyed to a drum shaft member 54. A rear clutch 56 is provided for selectively coupling the member 54 and the sun gear 50 to the shaft 32 and it may be energized by a fluid pressure operated servo having an annular piston 58 as indicated. A front brake band 60 encircles the member 54 and is adapted to anchor the same in alternating sequence with respect to the operation of clutch 56.

The planetary gear unit 16 further includes a carrier 62 which is adapted to rotatably journal a set of short planet pinions 64 and a set of long compound planet pinions 66, the former engaging sun gear 48 and the latter engaging sun gear 50. The individual pinions of the set of short planet pinions 64 drivably engage the corresponding pinions of the set of long planet pinions 66. In addition, ring gear 68 for the planetary unit 16 is situated in driving engagement with a set of long planet pinions 66.

The power output shaft is shown at 70 and it is positively connected to ring gear 68. Further, carrier 62 is formed with a drum member 72 which is encircled by a brake band 74. The power output shaft 70 is keyed or otherwise positively connected to a positive displacement rear pump 76 which forms a part of the transmission control mechanism.

In operation the transmission structure herein disclosed is capable of providing three forward driving torque ratios and a single reverse ratio. To obtain the highest torque ratio, brake band 74 and clutch 44 are simultaneously energized while the rear clutch 56 and front band 60 are de-energized. This causes the carrier 62 of the planetary gear unit 16 to be anchored, thereby conditioning the same to act as a reaction member for the driving torque delivered to sun gear 48. Sun gear 48 drives the elements of the short planetary pinion set 64 which in turn drives the pinion set 66 and this in turn causes the ring gear 68 to turn in the same direction as the direction of rotation of sun gear 48 thereby driving power output shaft 70 at a reduced speed ratio. The torque exerted on turbine member 30 is transferred through clutch 44 to shaft 42 and this turbine torque is obtained in the usual fashion by the hydrokinetic effect of the fluid circulation caused by the pump member 32.

To obtain intermediate ratio operation, brake band 74 may be released while brake band 60 is applied. This causes sun gear 50 to become anchored so that it serves as the torque reaction member of the planetary gear unit 16. This causes the compound carrier assembly of planetary gear unit 16 to revolve about its own axis in the direction of rotation of sun gear 48. Also, ring gear 68 turns in the same direction at a reduced speed ratio to provide an intermediate driving speed.

To condition the mechanism for operation in the third ratio, both brake bands may be released while both clutches are simultaneously applied. This causes sun gears 48 and 50 to be locked together, thereby allowing the same to rotate in unison. The torque ratio for the planetary gear unit 16 is therefore equal to unity.

To obtain reverse drive operation, brake band 74 and clutch 56 may be applied while the front band 60 and clutch 44 are both released. It is thus apparent that a driving connection is established between the drive shaft 42 and the sun gear 50. Since carrier 62 is anchored by brake band 74, the ring gear 68 will be driven in a reverse direction thereby causing the power output shaft 70 to rotate in a reverse direction.

It is apparent from the foregoing description that the clutch 56 is de-energized during operation in the highest torque ratio range and that the drum member 54 is rotated about its axis under these conditions. This tends to create a centrifugal fluid pressure build up behind piston 58, and if the speed of rotation of the clutch cylinder is sufficiently high, the piston 58 will tend to move toward an applied condition under the influence of centrifugal fluid pressure against the opposing force of the clutch return spring, said spring being designated in Figure 1 by numeral 78. If this "drift-on" condition occurs during low speed operation, opposing torques will be set up which will cause premature clutch failure and overloading of the transmission components. The improved clutch structure of my instant invention is designed to eliminate this centrifugal pressure build up problem and it therefore eliminates numerous service problems traceable to this condition.

Referring next to Figures 2 through 5, I have illustrated on an enlarged scale a servo piston for the rear clutch 56 and it includes an annular working surface 80 and a peripheral boss 82, the latter being adapted to engage the multiple discs of the clutch 56. The boss 82 is recessed as shown at 84 and a fluid flow restricting passage 86 extends axially through piston 58 to establish communication between the working fluid acting on surface 80 and the exterior region of the clutch structure. When the clutch piston is actuated to a clutch operating position, the clutch discs will close recess 84 to prevent passage of pressurized fluid through passage 86. The periphery of piston 58 may be grooved as shown at 88 to receive therein a fluid seal.

The member 54 is formed with an annular cylinder within which the piston 58 is received and the sleeve shaft 52 is received through a cylindrical opening 90 formed in piston 58. The cylinder defined by member 54, the piston 58 and shaft 52 define the working chamber situated on the right hand side of the piston 58 as viewed in Figure 1.

A passage is situated at a radially inward location in piston 58 and it comprises a first relatively large diameter portion 92 and a second small diameter portion 94. A ball check valve 96 is situated in passage portion 92 and the edge of passage portion 92 may be deformed as indicated in Figure 4 at 98 after the valve 96 has been assembled to prevent the same from withdrawing from the passage. It is thus apparent that clutch operating pressure will cause the ball valve element 96 to be seated against the annular seat provided by the passage portion 94. The left side of the valve 96 is exposed to atmospheric pressure which exists in the region of the clutch return spring 78, and the valve 96 will therefore be operated under the influence of differential pressure.

When operation of the rear clutch is first initiated, fluid pressure will be admitted through a fluid inlet passage or pressure distributor passage shown in part in Figure 1 at 100 which communicates with the rear clutch working chamber. Since the flow capacity of this inlet passage is greater than the flow capacity of bleed passage 86, a pressure build up will occur behind piston 58. The valve 96 will immediately close by reason of this pressure build up and the piston 58 will be moved toward a clutch applied position until the abutment portion 82 becomes fully in contact with the multiple discs of the clutch 56. When this occurs flow through the passage 86 is interrupted and the clutch thus assumes a steady state condition. When the clutch operating pressure is released, the clutch operating spring 78 will return the clutch piston 58 to the position shown in Figure 1 and the fluid retained within the clutch working chamber will then be pumped out of passage 86 under the influence of centrifugal action. The effective pressure acting on the right side of the check valve 96 will therefore be reduced below atmospheric pressure and this valve will therefore become unseated to permit air to be drawn into the working chamber to replace the fluid which is pumped out of passage 86. This action continues until the clutch chamber has been substantially filled with air. It is therefore apparent that further centifugal pressure build up will not occur and it will be impossible for the clutch to subsequently drift on during operation in low drive range.

The fluid passages leading to the clutch chamber for supplying the latter with clutch operating pressure and which form a portion of the transmission control circuit are not vented by reason of the operation of clutch valve 96 and they remain filled with operating fluid. Further, the fluid itself does not become aerated and the timing of the clutch during a shift sequence is not adversely affected.

Having thus described the principal features of one embodiment of my invention, what I claim and desire to secure by U.S. Letters Patent is:

1. A fluid pressure operated mechanism comprising a pressure cylinder having a geometric axis of rotation, a piston slidably disposed in said cylinder and defining therewith a working chamber, a pair of passages formed in said piston, one passage being located radially outward from the axis of rotation relative to the other, and a check valve means in the radially inward passage for accommodating the passage of air into said working chamber while inhibiting the transfer of fluid pressure from the working chamber.

2. In a fluid pressure operated mechanism, a pair of walls defining in part a fluid pressure chamber, one wall being movable relative to the other, said mechanism being adapted to rotate about an axis of rotation, an air passage extending axially through one of said walls, said passages being of different diameters with the larger diameter passage being located radially inward relative to the other passage, a check valve means in the radially inward passage for accommodating the passage of air directly into said pressure chamber while enabling the transfer of fluid pressure from the pressure chamber, and pressure distributor passages communicating with said pressure chamber, the radially outward passage defining a flow restricting orifice having a flow capacity substantially less than the flow capacity of said pressure distributor passages.

3. A fluid pressure operated clutch comprising an annular cylinder, an annular piston disposed in said cylinder and defining therewith a fluid pressure chamber, clutch plates disposed adjacent the outer periphery of said piston and adapted to be contacted thereby to effect a clutching action therebetween, a bleed passage formed in said piston adjacent said plates, said bleed passage being adapted to be closed by said clutch plates when the latter is contacted by said piston, a vent passage forming said piston at a radially inward location, and a differential pressure operated valve element located in said vent passage adapted to prevent the passage of fluid from said fluid pressure chamber during operation and to admit air directly into said working chamber when said piston is retracted away from said plates, said bleed passage being effective to allow the fluid within said pressure chamber to become exhausted therethrough under the influence of centrifugal action, the air introduced into said pressure chamber through said vent passage replacing the exhausted fluid.

4. A fluid pressure operated clutch comprising an annular cylinder, an annular piston disposed in said cylinder and defining therewith a fluid pressure chamber, pressure distributor passage means for introducing pressurized fluid into said chamber to energize said clutch, clutch plates disposed adjacent the outer periphery of said piston and adapted to be contacted thereby to effect a clutching action therebetween, a bleed passage formed in said piston adjacent said plates, said bleed passage being adapted to be closed by said clutch plates when said piston is caused to engage said plates, the fluid flow capacity of said bleed passage being substantially less than the flow capacity of said distributor passage means, a vent opening formed in said piston at a radially inward location, and a differential pressure operated valve element located in said vent passage adapted to prevent the passage of fluid from said fluid pressure chamber during operation and to admit air directly into said working chamber when said piston is retracted away from said plates, said bleed passage being effective to allow fluid within said pressure chamber to become exhausted therethrough under the influence of centrifugal action, the air introduced into said pressure chamber through said vent passage replacing the exhausted fluid.

5. A fluid pressure operated clutch comprising an annular cylinder, an annular piston disposed in said cylinder and defining therewith a fluid pressure chamber, distributor passage means for introducing pressurized fluid into said chamber to energize said clutch, clutch plates disposed adjacent the outer periphery of said piston and adapted to be contacted thereby to effect a clutching action therebetween, a bleed passage formed in said piston adjacent said plates, said bleed passage being adapted to be closed by said clutch plates when said piston is caused to engage said plates, the fluid flow capacity of said bleed passage being substantially less than the flow capacity of said distributor passage means, a vent opening formed in said piston at a radially inward location, and a differential pressure operated valve element located in said vent passage adapted to prevent the passage of fluid from said fluid pressure chamber during operation and to admit air directly into said working chamber when said piston is retracted away from said plates, said bleed passage being effective to allow the fluid within said pressure chamber to become exhausted therethrough under the influence of centrifugal action, the air introduced into said pressure chamber through said vent passage replacing said exhaust fluid, said valve passage having a relatively large diameter portion communicating with said pressure chamber and a relatively small diameter portion communicating with the exterior region of said clutch and said valve element comprising a ball located in said large diameter passage portion, one side of said ball being subjected to fluid pressure existing in said pressure chamber and the other side thereof being exposed to atmospheric pressure.

6. The combination as set forth in claim 5 wherein said vent passage communicates with said pressure chamber at a location of minimum radius.

References Cited in the file of this patent

UNITED STATES PATENTS

| | | |
|---|---|---|
| 2,163,202 | Kegresse | June 20, 1939 |
| 2,670,828 | McFarland | Mar. 2, 1954 |
| 2,876,743 | Maki | Mar. 10, 1959 |

FOREIGN PATENTS

| | | |
|---|---|---|
| 684,091 | Germany | Nov. 22, 1939 |

UNITED STATES PATENT OFFICE

CERTIFICATION OF CORRECTION

Patent No. 2,925,159                  February 16, 1960

Paul R. Black

It is hereby certified that error appears in the above numbered patent requiring correction and that the said Letters Patent should read as corrected below.

Column 3, line 16, for "crankshaft" read -- shaft --.

Signed and sealed this 6th day of June 1961.

(SEAL)
Attest:

ERNEST W. SWIDER
Attesting Officer

DAVID L. LADD
Commissioner of Patents